United States Patent [19]
Cunningham et al.

[11] Patent Number: 5,991,596
[45] Date of Patent: Nov. 23, 1999

[54] WIRELESS REQUEST CHANNEL FOR USE WITH INFORMATION BROADCAST SYSTEM

[75] Inventors: Kenneth Cunningham, Hamilton; Joseph Smallcomb, Herndon, both of Va.; Aaron Weinberg, Potomac; Daniel Urban, Silver Spring, both of Md.; Ray Allen Daniel, Leesburg, Va.; Joseph Ziegler, Reston, Va.; Rudy Rihani, Manassas, Va.

[73] Assignee: Stanford Telecommunications, Inc., Reston, Va.

[21] Appl. No.: 08/736,111

[22] Filed: Oct. 24, 1996

[51] Int. Cl.$^6$ .............................. H04N 7/20; H04B 7/185
[52] U.S. Cl. ............................... 455/12.1; 348/10; 348/12
[58] Field of Search ............................... 455/4.2, 6.1, 6.2, 455/12.1, 13.1, 13.2, 517, 524, 3.2, 6.3, 5.1; 348/10, 12, 13, 17; H04N 7/173, 7/20

[56] References Cited

U.S. PATENT DOCUMENTS

| | | | |
|---|---|---|---|
| 4,616,108 | 10/1986 | Yamaguchi et al. | 455/12.1 |
| 4,751,732 | 6/1988 | Kamitake | 455/12.1 |
| 4,975,771 | 12/1990 | Kassatly | 455/267 |
| 5,446,756 | 8/1995 | Mallinckrodt | 455/427 |
| 5,455,823 | 10/1995 | Noreen et al. | 455/12.1 |
| 5,479,400 | 12/1995 | Dilworth et al. | 455/524 |
| 5,696,765 | 12/1997 | Safadi | 370/436 |

*Primary Examiner*—Reinhard J. Eisenzopf
*Assistant Examiner*—Edan Orgad
*Attorney, Agent, or Firm*—Jim Zegeer, Esq.

[57] ABSTRACT

An information broadcast system having a broadband broadcast system selected from cable and satellite for broadcasting requested information from a selected information source, including the Internet, to one or more selected subscriber stations includes an independent backhaul channel for communicating information request signals from a subscriber station to one or more central processing stations. The system includes a data broadcast station for transmitting requested data from the selected data source and central station via the data broadcast station to the one or more selected subscriber stations. The high-data rate broadcast station forwards requested data from a data source to the data broadcast station. A backhaul satellite communication system, independent of the broadband broadcast system, has a backhaul satellite ground terminal for coupling information request signals from backhaul satellite communication system to high data broadcast station terminal. Each subscriber station has a broadband broadcast receiver for receiving requested information broadcast by the high data rate broadcast and a satellite antenna for transmitting backhaul request signals to the backhaul satellite.

5 Claims, 3 Drawing Sheets

WIRELESS REQUEST CHANNEL FOR USE WITH INFORMATION BROADCAST SYSTEM

BACKGROUND AND BRIEF DESCRIPTION OF THE INVENTION

Numerous information broadcast services, both satellite and terrestrial wired (e.g. cable) and wireless, are available today and future growth in this industry is anticipated. In many cases, these broadcast services offer/require a means for interactive information exchange with the subscriber. Such interaction is typically asymmetric in nature with subscriber stations receiving a much greater amount of information than they transmit. As such, the subscriber station must be equipped with a means of receiving large amounts of information from the broadcast channel and transmitting small amounts of information on the request or backhaul channel (FIG. 1 is a block diagram of the generalized architecture for systems incorporating the invention.) Note also that a means for transparently interconnecting the two independent systems (i.e., the Broadcast Channel and the Backhaul Channel) may be required. This will likely be necessary whether the two systems are owned/operated by a single entity or by different entities.

Currently, the leading ways of providing the backhaul channel is through use of a data modem operating through the public telephone system. In many cases, this approach is convenient and cost effective, requiring a simple wired or cellular connection to the telephone system. Subscribers that desire timely delivery of large amounts of information via satellite may do so from virtually any location in the world so long as a telephone circuit is available for placing requests. However, many applications exist which pass small amounts of request data and would benefit by a wireless solution with greater bandwidth efficiency.

The object of this invention is to provide bandwidth efficient wireless backhaul channel which is a flexible and efficient alternative to the telephone circuit. It is wireless, which precludes physical connection, covers large regions, and can be shared among a subscriber community so as to make better use of bandwidth with the potential for cost benefits for both the user and the broadcast provider. Furthermore, even though the backhaul channel device could be one-way (transmit only) or two-way (transceiver) the backhaul only needs to have a one-way link with the broadcast provider which is more bandwidth efficient for the provider. These features make this solution very attractive for a wide variety of users such as:

Satellite broadcast providers.
Military field personnel.
Emergency response teams.
Travelers (RV's, aircraft)
Boaters.
Automated data collection/reporting sites.
Cable TV subscribers.

This invention relates to a unique means for providing a backhaul channel. This approach may be used for both satellite and terrestrial broadcast systems as a way of providing a backhaul with the following innovative, advantageous and unique features:

The backhaul channel can be independent of the wideband broadcast channel, with any coordination required between the backhaul and broadcast service provider handled in a manner which is transparent, or of little impact, to both.

The subscriber can use this backhaul channel as an alternative to other conventional means; this provides a subscriber with flexibility to circumvent "busy periods" or "service outages" of a given conventional backhaul service provider, and further places the subscriber in the attractive position of selecting the most cost-effective approach.

This approach explicitly exploits the asymmetric nature of information exchange (low rate on backhaul; high rate on broadcast) to:

Efficiently use backhaul bandwidth—much more efficient than a telephone channel, which sits idle (but connected) during many broadcast request sessions.

Permit simple, random-access protocols on the backhaul channel.

Allow the use of a very compact, very low-power, device for the backhaul channel—no need for a more complex two-way telephone transceiver; this, for example, frees up the transmit counterpart of the two-way bandwidth of the typical two-way satcom telephone channel for other uses, such as one way paging services.

Control feedback in the form of small data packets may be sent over the broadcast channel to increase capacity on the backhaul channel (e.g., to provide backhaul transmit timing corrections).

Messages, in the form of small data packets, may be sent over the broadcast channel to provide user verification, inform the users of request status, assist in antenna alignment, etc.

The backhaul device can be implemented so that it connects to an existing telco interface connector on the broadcast receiver/modem and responds such that its installation is transparent to the user (or the receiver/modem) and no modification of the existing equipment is required.

Provides connectivity over wide regions, with global connectivity via LEO, GEO, or MEO satellite constellations.

Accommodates system growth. Additional satellite bandwidth may be purchased/leased as the subscriber grows.

Enables flexibility in the overall infrastructure (e.g., gateway locations/design) of the system.

The remainder of the application addresses the use of satellite communications as the means for implementing the backhaul channel. Note that the use of a wireless terrestrial equivalent for a limited geographic region is also possible.

DESCRIPTION OF THE DRAWINGS

The above and other objects, advantages and features of the invention will become more apparent when considered with the following specification and accompanying drawings, wherein.

DETAILED DESCRIPTION OF THE INVENTION

Figure 1:
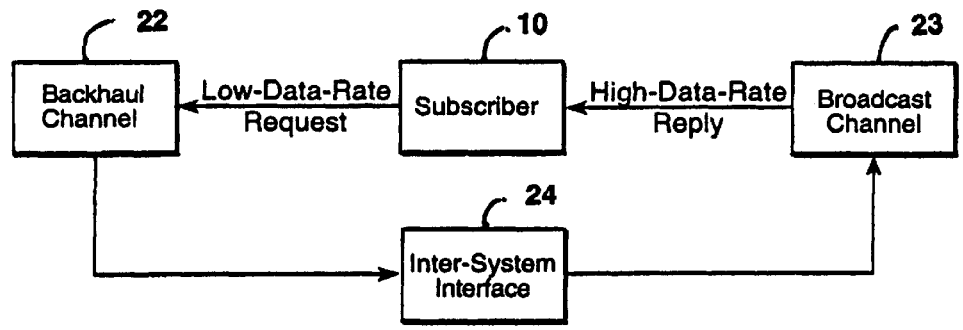
FIG. 1 is a block diagram of an information broadcast system for transmitting large amounts of information to a subscriber who has transmitted a low data rate information request signal on a backhaul channel incorporating the invention.
Figure 2:
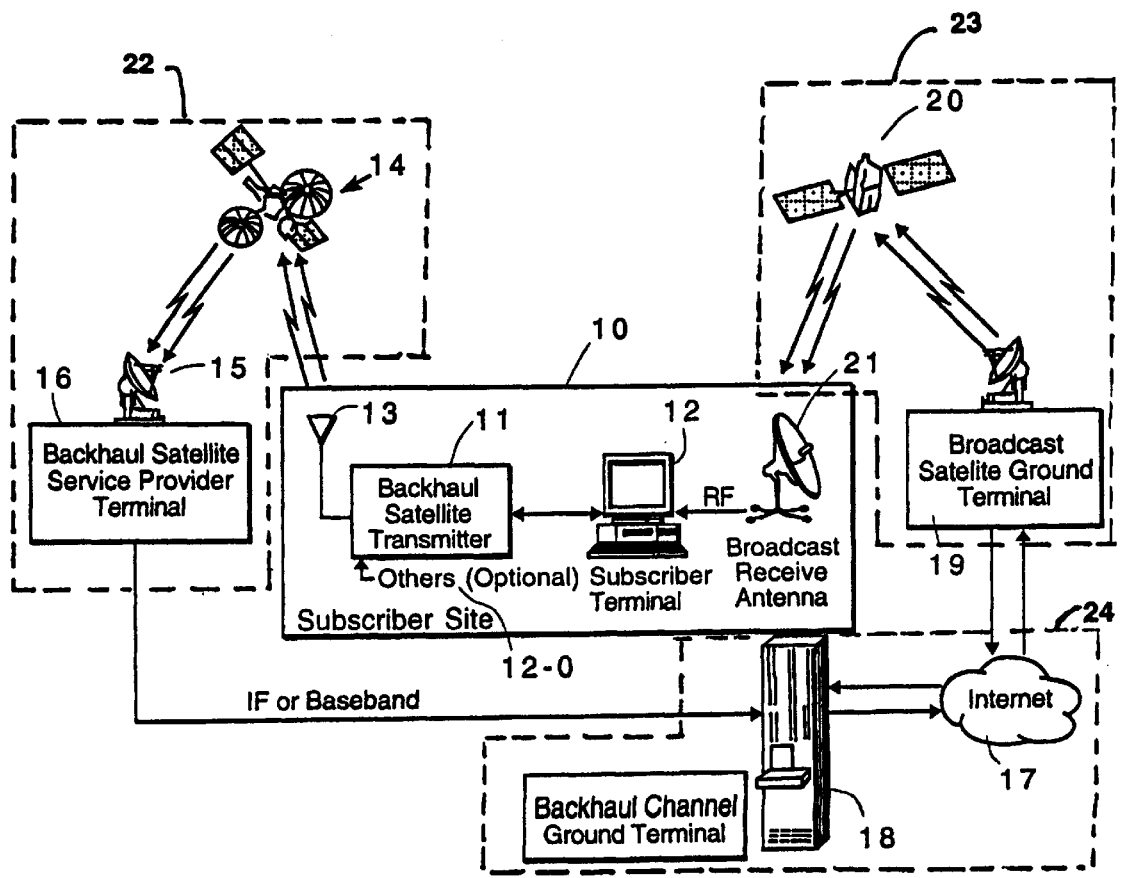
FIG. 2 is a more detailed block diagram of a satellite broadcast Internet access system incorporating the invention.

The invention is a merger of two independent communication links—each having special attributes—selected to yield a duplex service capable of providing subscribers with a means of requesting and receiving information. FIG. 2 provides an overview of an example system providing Internet access via satellite broadcast, for example.

In this example, the subscriber site 10 is provided with a backhaul satellite transmitter 11 which is coupled to receive low data rate information request signals from the subscriber terminal 12 (and, optionally, from other sources 12-0, if desired) and transmits information request signal on antenna 13 to backhaul satellite 14. An example of the transmit only backhaul channel signal formal and details (multiple access, 2.4 kbps data rate 0.24 seconds burst, 50 users per channel). The backhaul satellite 14 may be geosynchronous with orbit (GES) medium or low altitude earth orbits, national or international) and transmits the backhaul information request signal from the subscriber site 10 to the receiving antenna 15 and backhaul receiver at the backhaul service provider terminal 16. The backhaul satellite service provider terminal 16 is coupled (at IF or baseband level) to the backhaul channel ground terminal 18 which in turn forwards the information request signal to the Internet 18 in the usual and conventional fashion. The requested information is received from the Internet 17 and transmitted to broadcast ground terminal 18 which broadcasts the mass of requested information at a high data rate via the antenna 19 to the broadcast satellite 20, which in turn broadcasts the requested information to the broadcast receive antenna 21 at the subscriber site 10 which supplies the requested information to the subscriber terminal 11.

Under this configuration, three key features become evident. One, it is possible to operate the backhaul channel as a transmit only (i.e., simplex) channel to the broadcast provider. Second, feedback to control transmission timing is possible through information transfers on the broadcast channel or on transmissions from the backhaul ground terminal 18. Feedback enables the use of protocols (e.g., slotted ALOHA, time division multiple access, etc.) which have greater throughput efficiency than, for instance, a simple random access protocol (e.g., ALOHA) with no feedback. Third, flexibility to "mix and match" providers of broadcast and backhaul services is possible. This facilitates system optimization for specific applications which can:

Circumvent busy periods and slow response times.

Adapt to use the most cost effective links.

Tailor the backhaul to satisfy requirements of varying applications.

Subscriber Terminal

The preferred approach for providing the backhaul channel is through use of a transmit only device. Such a device is preferably integrated with other elements consisting of a personal computer and a broadcast receiver (cable or wireless) to realize the subscriber terminal. The transmitter is preferably capable of operating in conjunction with the satellite transponder of a company/service which would likely be different than the provider of the broadcast service. In other words, the composite system could be composed of two separate one-way systems.

Backhaul Satellite 14

Numerous commercial satellite systems are currently available and new ones are expected to emerge. Inmarsat, American Mobile Satellite Corporation (AMSC), and Orbcomm are examples of satcom providers which could potentially support backhaul services. Future satellite systems (i.e., GEO, MEO, and LEO), terrestrial or satellite PCS providers, and other communications links will also serve as candidates. The proper selection of links, both backhaul and broadcast, will provide for global operation.

Because of the desire to quickly pass information requests, usually one-way from the subscriber, over the backhaul channel it may be necessary to establish new services for these satellites rather than applying existing, slower, and less bandwidth efficient services. For example, AMSC offers a duplex voice service which could be used as a backhaul. However, this requires considerably more bandwidth than is necessary for passing occasional information requests. Existing data services on these satellites may also serve backhaul but they typically have latency on the order of minutes which is not desirable for most applications. As a result, the proposed system may require that portions of bandwidth within one or more of these systems be set aside and used specifically for backhaul services as described by this application.

Backhaul Channel Ground Terminal 18

Figure 3:
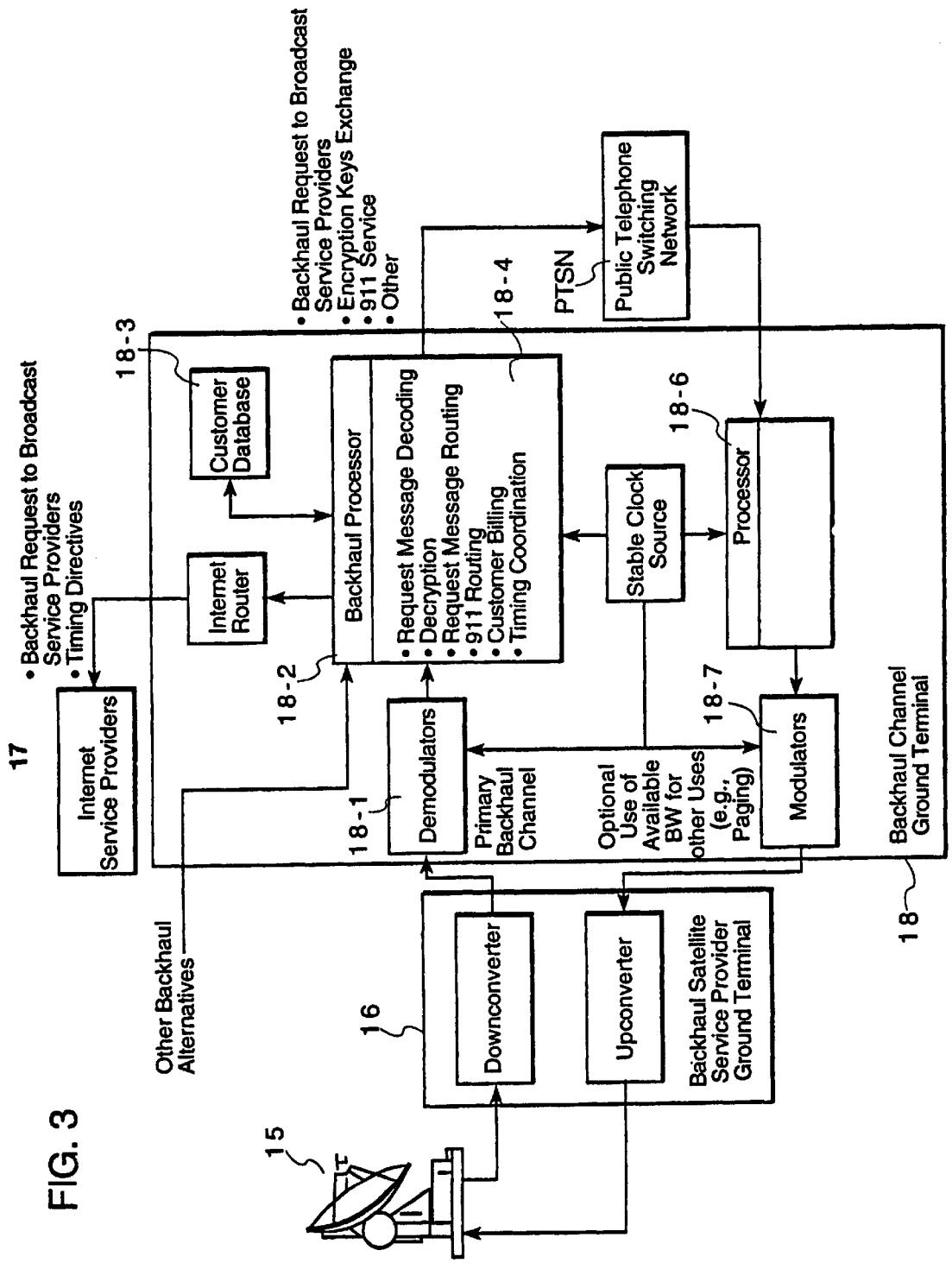
FIG. 3 is a detailed block diagram of the backhaul channel ground terminal.
Figure 4:
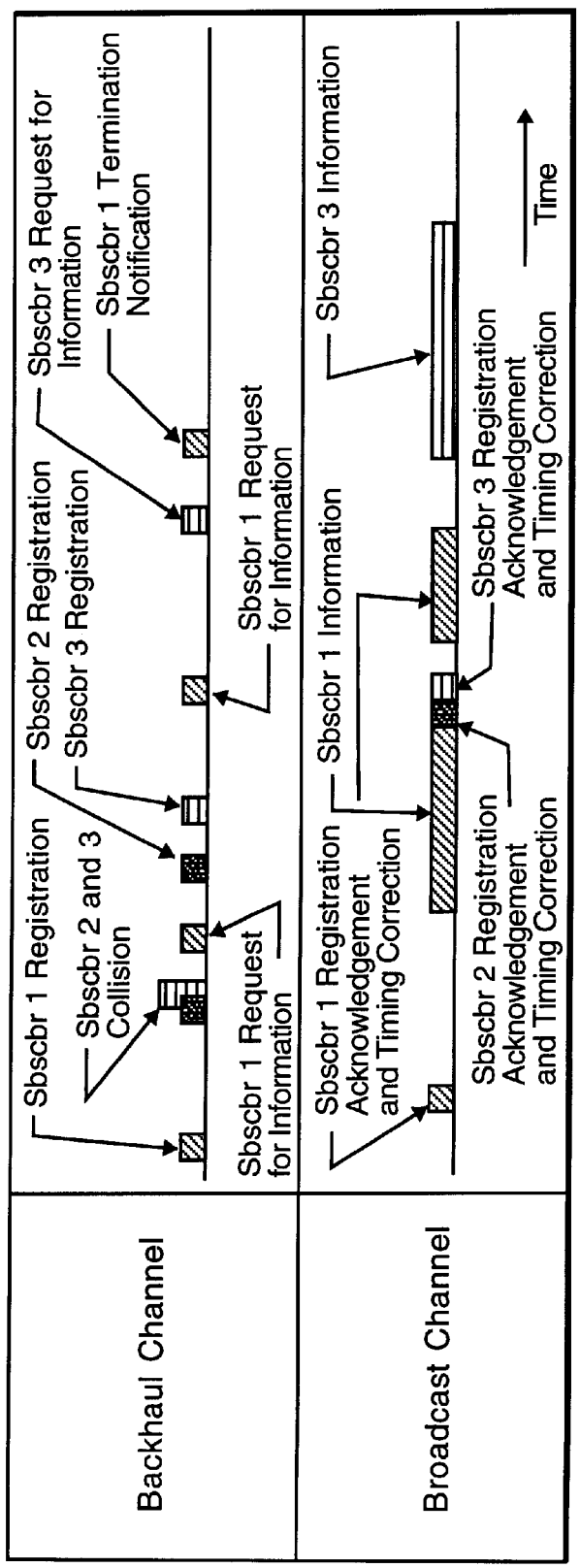
FIG. 4 is a diagram illustrating an example of data flow in an information broadcast system incorporating the invention.

The Backhaul Channel Ground Terminal (BCGT) 18 shown in FIG. 3 may be completely separate and independent of both the backhaul satellite and broadcast service provider. A single BCGT can access several different broadcast service providers and separate BCGT's can be connected with different backhaul satellite service providers. Links to the broadcast service providers can be over the Internet 17, as shown, wired telephone service, etc.

The primary operation of the Backhaul Channel Ground Terminal 18 is to receive backhaul requests from subscribers, demodulator 18-1, process request signals 18-2, and deliver the request messages to the proper broadcast providers. In addition, the ground terminal can handle customer database 18-3 management and billing, message timing coordination, message encryption/decryption services and other services 18-4 (e.g., 911 emergency call routing). The BCGT 18 can also include paging processor 18-6 to send data (paging messages) via modulator 18-7 to the backhaul satellite service provider 16 in order to utilize the excess forward link bandwidth that will likely be the result of using the complimentary backhaul channel bandwidth of the return link.

Ground Terminal Interface

Linkage between the backhaul satellite ground terminal and that of the broadcast satellite can be accomplished in order to achieve the appearance of duplex operation through these two independent systems. The interface between ground terminals is important if the system is to satisfy the demands of the subscriber community while working within the constraints of existing ground terminal infrastructure. This is particularly true if any timing, synchronization, keying, or other form of coordination is required for subscriber terminals to function within the system.

In many cases, the ground terminal for the broadcast satellite is designed to accept data from a designated source and to forward this data over the satellite. The proposed system treats the timing, synchronization, keying, and any other form of coordination information as data. For example, the backhaul ground terminal may determine that a backhaul transmit timing correction is required for a specific subscriber terminal and the correction must be passed to the terminal. Under the proposed system, the timing correction could be treated as a small data package ad sent out to the subscriber terminal via the broadcast channel. This form of linkage between the two ground terminals has no operational impact or deviation on the individual ground terminals and is a goal of this system.

Broadcast Provider 9

Today's commercial broadcast systems (cable or wireless) offer wide bandwidth channels. Wider bandwidth translates into the potential for additional subscriber services. For instance, audio/video, data, and interactive channels may all be supported by a common broadcast system. The proposed system is intended to function with all such broadcast satellites/services.

SYSTEM DESIGN

There are numerous considerations within the ambit of the present invention which can influence the final design of the backhaul system. For instance, the delay between time of request and the arrival of the requested data may or may not be important. In the case of an Internet browser application, one would expect short delays to be desired at the expense of overall throughput efficiency. In contrast, an application with very infrequent access (e.g., e-mail access) would probably favor throughput efficiency/low-cost over time delay.

Another consideration for the backhaul design is the amount of available bandwidth. Initial deployment of a sparsely utilized code division multiple access system could require considerably more bandwidth than a time division multiple access system with equivalent user loading. This could be a key cost factor when considering the establishment and gradual expansion of a backhaul system.

The system can use time and frequency division techniques with limited control/synchronization through feedback from the broadcast channel. The use of other signaling types is possible (e.g., CDMA) and are not excluded. However, parties knowledgeable in the art will recognize that other variants are possible.

NOVEL FEATURES OF THE INVENTION INCLUDE THE FOLLOWING

Wired and wireless (i.e., satellite (GEO, MEO, and LEO) and terrestrial) broadcast systems, providing information services and requiring asymmetric data flow can be realized by:

- Combining two, or more, separate one-way systems in a manner which provides the appearance of near-realtime duplex operation. Two separate systems would be those who do not operate with paired transmit/receive channels (e.g., paired in the manner in which cellular telephone has a standard transmit and receive allocation).
- Establishing/using an efficient backhaul means for passing infrequent, low-rate requests from the user to a desired information source. Multiple backhaul link alternatives may be utilized to circumvent "busy" periods, insure throughput, and permit selection based on cost effectiveness.
- Establishing/using a wide band broadcast means for passing substantial amounts of data to a designated subscriber.
- Selecting the link characteristics for wireless systems to accommodate use of a wide beam-width antenna to facilitate backhaul transmitter pointing and accommodate mobile applications.
- Designing an interface and protocol, between the backhaul and broadcast terminals, to enable nonintrusive, or marginally intrusive operation of the overall system.
- Using the broadcast channel to carry network information (in a similar manner to information which is typically broadcast) necessary to calibrate, synchronize, encrypt/decrypt, authenticate, bill, and otherwise support operations.
- Using a wide range of modulation/signaling/channel types.
- Sending small packets over the broadcast channel upon receipt of a request in order to let the subscriber know that the request was received, support antenna pointing, etc.
- A wireless terrestrial system, with the same general structure as the satellite system, may be employed for use over limited geographic regions.
- Incorporate adaptive, or selective, transmission data rates depending on the amount of data that the user has to send or the willingness of the user to pay more for a faster service.

Benefits of said system include:

- Realization of an efficient backhaul resource with power/size/cost savings. Fewer channels, with only one-way operation may be required.
- System simplification with fewer communications links and less equipment.
- Global/wide regional coverage.
- Potential for backhaul operations which are autonomous of the backhaul resource manager. This may include an independent ground terminal in the footprint of the backhaul signal that simply receives backhaul signals and requires no interaction (other than transponder bandwidth allocation) with the overall backhaul resource manager.
- Flexible/multiple backhaul providers with interconnects to multiple broadcast providers.
- Accommodation of growth as the number of backhaul users expands.
- Provides connectivity over global/wide regions.
- A wide variety of applications including billing, keying, etc.
- Use as an emergency notification channel. Backhaul transmitter can be coupled with a position determination device (e.g., GPS receiver) to provide a "911" capability for interested subscribers (e.g., forest firefighters).
- Use as a request line to query a special high rate backhaul link to trigger shipment of a large volume of data from the subscriber.
- Could be used as a backhaul channel for internet (or interactive TV) service over wired cable.
- Could be used in homes or businesses as a cost-effective alternative to a telephone backhaul (alleviates the need for a second telephone line).
- For encrypted backhaul requests, encryption keys, passwords, etc. can be periodically transferred to the backhaul transmitter via wired telephone.
- Surplus forward link bandwidth on the backhaul satellite could be used for data transmission to subscribers (e.g., paging service).
- The backhaul service can be utilized both by fixed subscriber terminals and mobile terminals either while in motion or temporarily fixed.
- Data security (e.,g., encryption, etc.) may be handled over the combination of the backhaul and broadcast channels or by occasional calls (via modem) to the BCGT to update security parameters (e.g., key, passwords, etc.).

While the invention has been described in relation to preferred embodiments of the invention, it will be appreciated that other embodiments, adaptations and modifications of the invention will be apparent to those skilled in the art.

What is claimed is:

1. In an information broadcast system having a broadband broadcast system selected from cable and satellite and/or other medium for broadcasting requested information from a selected data source, including the Internet, to one or more selected subscriber stations and means forming a backhaul channel for communicating information request signals from a subscriber station to one or more central processing stations, the improvement comprising, a broadband broadcast station for transmitting requested information from said selected source and central station via said broadband broadcast station to said one or more selected subscriber stations, said broadband broadcast station including means to forward requested information from said source to said broadband broadcast station, a backhaul satellite communication system which is independent of said broadband broadcast system, a backhaul satellite ground terminal means for coupling information request signals from said backhaul satellite communication system to said broadband broadcast station, each subscriber station including a broadband broadcast receiving means for receiving requested information broadcast by said broadband broadcast station satellite antenna for transmitting backhaul request signals to said backhaul satellite communication system.

2. The invention defined in claim 1 wherein information and control signals are included in said broadband broadcast signal to each subscriber station by said broadband broadcast system, said information and control signals being selected from calibration, synchronization encryption, decryption, authentication billing, and information and control signal utilization means at each of said subscriber stations for utilizing said information and control signals.

3. The invention defined in claim 1, said broadband broadcast system including means for sending request acknowledgement signals with said broadband broadcast signal for acknowledging receipt of said request signals by said broadband broadcast station of the information request signals of a given subscriber station.

4. The invention defined in claim 1, wherein said backhaul satellite communication system includes modulation means and an upconverter whereby residual forward link bandwidth can be utilized to send data to subscribers via said backhaul satellite.

5. In an information broadcast system having a broadband broadcast satellite for broadcasting requested information from a selected information source, including the Internet, to one or more selected subscriber stations and means forming a backhaul channel for communicating information request signals from a subscriber station to one or more central processing stations, the improvement comprising, a broadcast satellite ground station for transmitting requested data from said selected data source and central station via said broadcast satellite to said selected subscriber station, said broadcast satellite ground station including means to forward requested data from a data source to said broadcast satellite, a backhaul satellite which is independent of said broadcast satellite, a backhaul satellite ground terminal means for coupling information request signals from said backhaul satellite to said broadcast satellite ground terminal, each subscriber station including first and second satellite antenna means including a broadcast satellite receiving antenna for receiving requested information broadcast by said broadcast satellite ground station and a second satellite antenna for transmitting backhaul request signals to said backhaul satellite.

\* \* \* \* \*